F. WOJCICKI.
PERAMBULATOR.
APPLICATION FILED NOV. 3, 1921.
1,428,736.
Patented Sept. 12, 1922.
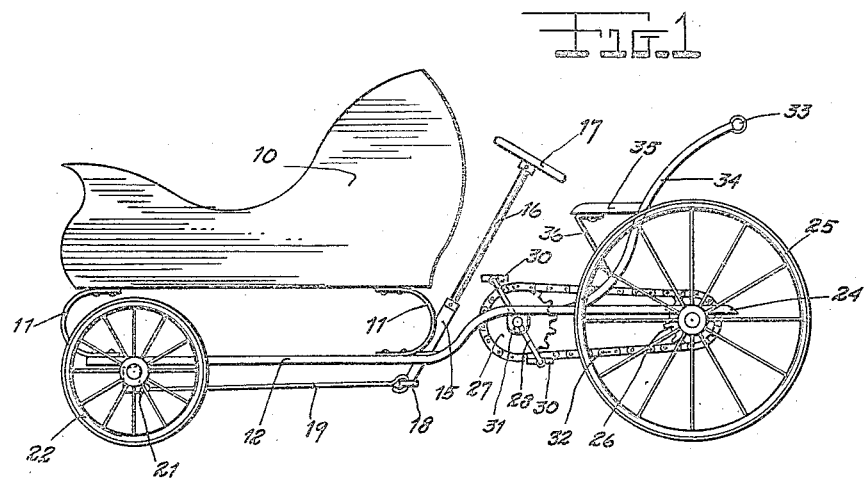
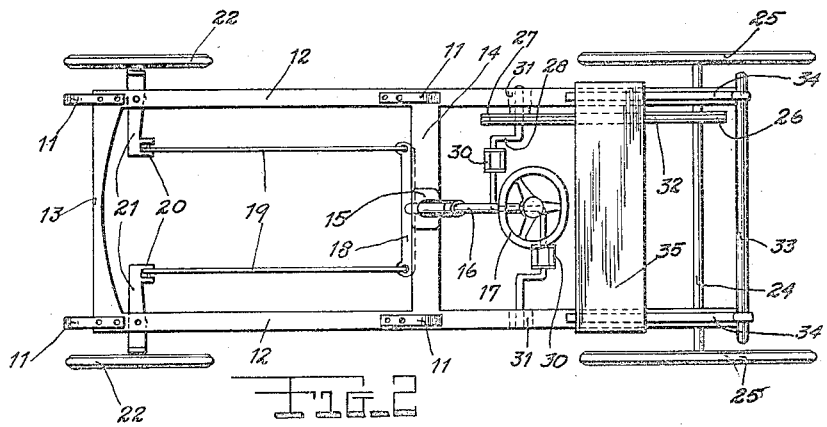
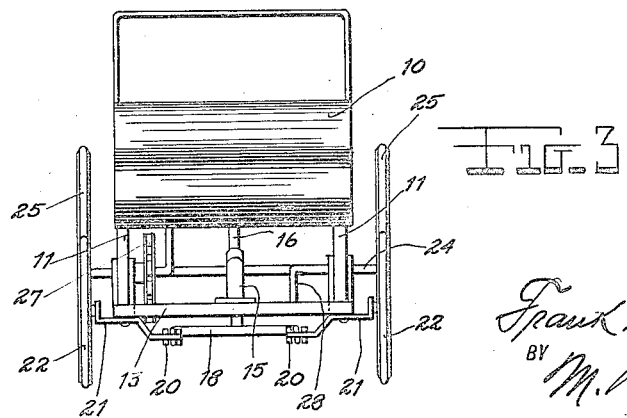
INVENTOR
Frank Wojcicki
BY
ATTORNEY Patented Sept. 12, 1922.

1,428,736

UNITED STATES PATENT OFFICE.

FRANK WOJCICKI, OF BAYONNE, NEW JERSEY.

PERAMBULATOR.

Application filed November 3, 1921. Serial No. 512,421.

*To all whom it may concern:*

Be it known that I, FRANK WOJCICKI, citizen of Poland, residing at Bayonne, in the county of Hudson and State of New Jersey, have invented certain new and useful improvements in Perambulators, of which the following is a specification.

One of the objects of this invention is to provide a vehicle in which is combined a perambulator and pedally actuated propelling means adapted to be used by one or several children simultaneously.

Another object is the provision of means whereby a person walking in the rear of the device may propel and direct its movement and supervise the activities of the riders.

These and other objects are attained by the novel construction and arrangement of parts hereinafter described and shown in the accompanying drawing, forming a material part of this disclosure, and in which:—

Figure 1 is a side elevational view of my invention.

Figure 2 is a top plan view of the same with the carriage body removed.

Figure 3 is a front elevational view.

Referring to the drawing, the numeral 10 represents a baby carriage or perambulator body of conventional design, mounted on U shaped springs 11 attached to a frame having a pair of longitudinal offset side rails 12, connected at the front end by a cross bar 13 and at an approximately central point, with respect to the length of the cross rails 12, by another cross bar 14.

A steering bar bracket 15 is attached to the cross bar 14, centrally of its width and a bar 16 is rotatably mounted in the bracket 15, to extend angularly upward and is provided with a steering wheel 17 secured thereon.

A yoke 18 is fixed to the lower projecting end of the bar 16, and is provided with openings to engage the hooked ends of the steering rods 19, their opposite ends being provided with eyes pivotally engaged within the forked elements 20 of the steering knuckles 21.

These steering knuckles are pivotally attached to the underside of the side rails 12 and are provided at their outer ends with means to rotatably secure the front wheels 22 thereon.

A rear axle 24 passes rotatably through bearings provided in the rear end portions of the side rails 12 and secured on its ends are the rear wheels 25.

A sprocket 26 is fixed to the axle 24 and is in line with another sprocket 27 attached to a double throw crank shaft 28 operated by the pedals 30 and rotatable in the bearings 31 attached to the raised portions of the side rails 12, power thus initially derived being transmitted to the rear axle by a chain 32 engaging the sprockets 26 and 27.

A transverse handle 33, at the rear of the device, is held and supported by a pair of reversely curved side bars 34, their lower ends being rigidly connected to the side rails 12.

A seat 35 is attached at its rear edge to the side bars 34 and is further supported by angular brackets 36 engaging therewith.

While certain preferred embodiments of this device have been shown and described, it will be understood that changes may be made without departing from the scope of the invention as defined in the appended claim.

Having thus described my invention, what I claim as new and desire to secure by Letters Patent, is:—

A vehicle comprising a substantially rectangular frame, a perambulator body mounted at the front, a pair of driving wheels at the rear, a pair of pivoted axles at the front having wheels thereon, means for steering said front wheels, means for manually propelling the vehicle from the rear, a cranked shaft journalled in the side elements of said frame, a seat adjacent said shaft, pedals on the cranks of said shaft, and driving connections between said shaft and said rear wheels, said connections being closely adjacent one of said side frame members.

In witness thereof I affix my signature.

FRANK WOJCICKI.